United States Patent
Itou et al.

[19]

[11] Patent Number: 5,977,949
[45] Date of Patent: Nov. 2, 1999

[54] CHARACTER FORMING APPARATUS

[75] Inventors: Megumi Itou, Yamatokoriyama; Yutaka Shigi, Nara, both of Japan

[73] Assignee: Sharp Kabushiki Kaisha, Osaka, Japan

[21] Appl. No.: 08/854,742

[22] Filed: May 12, 1997

[30]     Foreign Application Priority Data

May 13, 1996  [JP]  Japan .................................... 8-118066

[51] Int. Cl.⁶ ................................................... G09G 1/16
[52] U.S. Cl. ........................... 345/142; 345/128; 345/144
[58] Field of Search .................................... 345/127, 128, 345/141–144, 400, 467–472; 340/747, 751; 364/419, 518; 395/110, 151, 167

[56]            References Cited

U.S. PATENT DOCUMENTS

| | | | |
|---|---|---|---|
| 4,670,841 | 6/1987 | Kostopoulos ............................ | 364/419 |
| 4,897,638 | 1/1990 | Kokunishi et al. ...................... | 340/751 |
| 4,931,953 | 6/1990 | Uehara et al. ........................... | 364/518 |
| 4,990,903 | 2/1991 | Cheng et al. ............................ | 340/731 |
| 5,016,001 | 5/1991 | Minagawa et al. ...................... | 340/747 |
| 5,257,016 | 10/1993 | Fujii et al .............................. | 345/143 |
| 5,468,077 | 11/1995 | Motokado et al. ....................... | 400/76 |
| 5,526,476 | 6/1996 | Motokado et al. ...................... | 395/151 |
| 5,537,131 | 7/1996 | Mitsuhashi et al. ..................... | 345/128 |
| 5,633,991 | 5/1997 | Hakaridani et al. .................... | 395/110 |
| 5,673,064 | 9/1997 | Seto ....................................... | 345/127 |
| 5,727,140 | 3/1998 | Ohtomo et al. .......................... | 395/167 |

OTHER PUBLICATIONS

M. Kiyotaka, et al., "Display Device for Information Processor", Japanese Laid–Open Patent Publication No. 3–132698, Laid Open on Jun. 6, 1991.

S. Kunio, Japanese Laid–Open Patent Publication No. 6–167963, Laid Open on Jun. 14, 1994.

*Primary Examiner*—Matthew Luu
*Assistant Examiner*—Jeff Piziali
*Attorney, Agent, or Firm*—David G. Conlin; David A. Tucker

[57]            ABSTRACT

A character forming apparatus includes (1) a character data storage unit for storing character data of each character pattern, the character data including a character code and the like, (2) a radical pattern data storage unit for storing a radical pattern and the like, (3) an input device for inputting the character code and a character size, (4) character data retrieving unit for retrieving character data corresponding to the inputted character code, (5) a character data coordinate changing unit for changing coordinates in accordance with the inputted character size, (6) a radical restoring unit for restoring a radical pattern, (7) a figure pattern restoring unit for changing the figure pattern and restoring it, (8) a developing unit for developing the restored character data into a dot pattern, and (9) an output device for outputting the dot pattern.

8 Claims, 7 Drawing Sheets

杏
- CHARACTER CODE  1641
- RADICAL PATTERN CODE
  - (木) BC20
  - RESTORATION INFORMATION (P1, P2)
  - FIGURE PATTERN DATA CHANGE INFORMATION
  - ...
  - RADICAL PATTERN CODE (口) BC30
  - RESTORATION INFORMATION (P3, P4)
  - FIGURE PATTERN DATA CHANGE INFORMATION

→ FIGURE PATTERN DATA CHANGE INFORMATION
- REPLACEMENT INFORMATION           FC30
- RESTORATION INFORMATION  COORDINATE(4 POINTS)
- POSITION CHANGE                   NULL
                                    NULL
- DEFORMATION                       NULL
                                    NULL

東
- CHARACTER CODE  3776
- RADICAL PATTERN CODE
  - (木) BC20
  - RESTORATION INFORMATION (P5, P6)
  - FIGURE PATTERN DATA CHANGE INFORMATION
  - ...
  - FIGURE PATTERN DATA CHANGE INFORMATION
  - RADICAL PATTERN CODE (日) BC40
  - RESTORATION INFORMATION (P7, P8)
  - FIGURE PATTERN DATA CHANGE INFORMATION

LEFT-DOWNWARD STROKE →
RIGHT-DOWNWARD STROKE →

FIGURE PATTERN DATA CHANGE INFORMATION
- REPLACEMENT INFORMATION           NULL
                                    NULL
- POSITION CHANGE                   FC30
         DIFFERENCE DATA ON POINT a
- DEFORMATION                       FC30
         DIFFERENCE DATA ON POINTS A AND B
- REPLACEMENT INFORMATION           NULL
- POSITION CHANGE                   FC40
         DIFFERENCE DATA ON POINT b
- DEFORMATION                       FC40
         DIFFERENCE DATA ON POINTS C AND D

PATTERN 「木」

FIG.7(b)

AFTER POSITION CHANGE OF LEFT-DOWNWARD STROKE AND RIGHT-DOWNWARD STROKE

FIG.7(c)

AFTER DEFORMATION OF LEFT-DOWNWARD STROKE AND RIGHT-DOWNWARD STROKE

FIG.7(d)

PATTERN 「日」IS ADDED AFTER HORIZONTAL AXIS IS DEFORMED

CHARACTER FORMING APPARATUS

FIELD OF THE INVENTION

The present invention relates to a character forming apparatus. More specifically, the present invention relates to a character forming apparatus for use in an electronic information processing apparatus, such as a word processor, a computer, an electronic pocket diary, wherein a character is formed by combining radical patterns each of which is composed of figure patterns.

BACKGROUND OF THE INVENTION

Recently a demand for forming characters with higher quality and printing or displaying them with the use of a character forming apparatus has been growing, and such a character forming apparatus has been required to have an outline font with which character output with high quality can be realized, instead of the conventional bit map font.

Such outline font is stored in a font ROM in a system, as font data having a plurality of coordinates obtained by sampling outlines of characters. The coordinates are read out as the need arises, and the coordinates are changed in accordance with the size and style of the character. Then, by painting over the inside of the outline, a character pattern is formed. In comparison with the conventional character formation with the use of the bit map font, this method has advantages such as a higher degree of freedom of character patterns, with which characters of high quality can be formed even in the case where various sizes of characters are formed. However, since coordinates of control points increase, the data quantity of the font data drastically expands. Besides, a longer period of time is required for conversion to bit map, thereby leading to a problem that the processing speed lowers.

Incidentally, the character pattern is formed by combining various stroke patterns, and likewise a Chinese character is formed by combining various radicals. Therefore, by restoring previously stored specific radical patterns so that a character thus formed is well-balanced, and by synthesizing data on the radical patterns as font data, it is possible to reduce types of stroke patterns and to form characters at a high speed.

However, in order to form one character pattern, it is necessary to combine several basic patterns so as to form each radical pattern. In this case, radical patterns having simple shapes tend to cause a character formed to be badly balanced, thereby resulting in that the character formed by combining the radicals has lower quality. In the case where there are many basic patterns, this causes not only the data capacity to expand, but also the period of time required for extracting basic patterns and synthesizing font data to increase.

Furthermore, in the character pattern forming method by referring to codes of figure elements constituting the character, applying an enlarging or reducing operation to data of the figure elements in accordance with the character size, and synthesizing the data, such method is suitable for forming character patterns, but it is not designed so as to cope with minute changes such as changes with respect to each stroke. As a result, in forming a certain radical pattern, a pattern having the same shape is always restored as an element pattern, and subtle differences in the radical included in the characters cannot appear.

SUMMARY OF THE INVENTION

The present invention is made in the light of the above-described problems, and the object of the present invention is to provide a character forming apparatus capable of improving the quality of the character patterns developed into dot patterns when character patterns are formed or changed, in comparison with that in the conventional case.

To achieve the above-mentioned object, the character forming apparatus of the present invention comprises (1) a character data storage unit for storing character data of each character pattern, the character data including a character code, a radical pattern code indicating a radical pattern, figure pattern data change information for correcting a figure pattern representing an outline of a stroke, and restoration information on a position and size of the radical pattern, (2) a radical pattern data storage unit for storing radical data including a radical pattern, a radical pattern code, radical restoration information, a figure pattern, and a figure pattern code, (3) an input unit for inputting the character code and the character size, (4) a character data retrieving unit for retrieving character data corresponding to the inputted character code from the character data storage unit, (5) a character data coordinate changing unit for changing coordinates for enlargement or reduction in accordance with the inputted character size, (6) a radical restoring unit for, in the case where a radical pattern code exists in the character data, restoring the radical data, (7) a figure pattern restoring unit for, in the case where a figure pattern code exists in the radical data, changing the figure pattern and restoring it, the figure pattern restoring unit being provided either inside or outside the radical restoring unit, (8) a developing unit for developing the restored character data into a dot pattern, and (9) an output unit for outputting the dot pattern.

With the above-described arrangement, when a character pattern is changed, it is possible to individually designate each of a plurality of figure patterns included in one radical pattern and restore them in the character pattern. In other words, when a character pattern is formed, figure pattern data and restoration information on each figure pattern included in one radical pattern can be individually designated for each character, and figure patterns suitable for each character can be restored. Therefore, the quality of the character patterns developed into the dot patterns can be improved, in comparison with the conventional cases.

Note that "figure pattern" means data representing an outline shape of each stroke constituting a character.

In the above arrangement, it is preferable that during the figure pattern changing operation by the figure pattern restoring unit, operations such as replacement, parallel transfer, and deformation by transfer of points on an outline are carried out.

By doing so, it is possible to apply minute changes to the figure patterns, by carrying out replacement of figure patterns, position changes such as parallel transfer, deformation by transfer of points on an outline, or the like.

Furthermore, it is preferable that the figure pattern restoring unit includes (1) a figure pattern replacement checking section for checking whether or not figure pattern replacement information exists in the figure pattern data change information in the character data, (2) a figure pattern data replacing unit for, in the case where the figure pattern replacement information exists, replacing the figure pattern data included in the radical data by referring to corresponding figure pattern data included as figure pattern replacement information in the character data, (3) a figure pattern position change checking unit for checking whether or not figure pattern position change information exists in the figure pattern data change information in the character data, (4) a figure pattern coordinate changing unit for, in the case where the figure pattern position change information exists, changing coordinates of points on the outline of the figure pattern so as to change the position of the figure pattern, (5) a figure pattern deformation checking unit for checking whether or not figure pattern deformation information exists in the figure pattern data change information in the character data, and (6) a figure pattern deforming unit for, in the case where the figure pattern deformation information exists, deforming the figure pattern in the radical data, in accordance with coordinates after deformation stored in the figure pattern deformation information.

With this arrangement wherein the replacement of figure patterns, the position change, and the deformation are carried out by the figure pattern data replacing unit, the figure pattern coordinate changing unit, and the figure pattern deforming unit, respectively, it is possible to carry out minute changes with respect to each figure pattern.

For a fuller understanding of the nature and advantages of the invention, reference should be made to the ensuing detailed description taken in conjunction with the accompanying drawings.

DESCRIPTION OF THE PREFERRED EMBODIMENTS

The following description will discuss an embodiment of the present invention, while referring to FIGS. 1 through 7.

Figure 1:
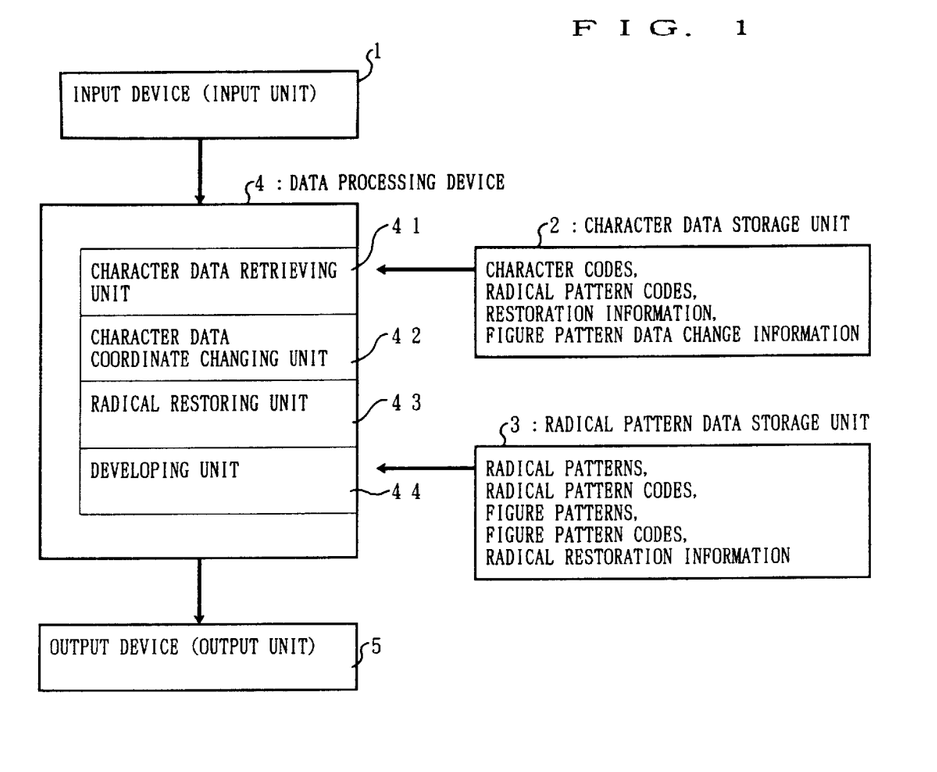
FIG. 1 is a block diagram illustrating a schematic arrangement of a character forming apparatus in accordance with one embodiment of the present invention.

FIG. 1 is a block diagram illustrating a schematic arrangement of a character forming apparatus in accordance with the present embodiment. The character forming apparatus has an input device (input unit) 1, a character data storage unit 2, a radical pattern data storage unit 3, a data processing device 4, and an output device (output unit) 5.

The input device 1 is composed of a key board, a mouse, a pointing device, and the like, with which character codes and sizes are inputted by the operator. The character data storage unit 2 is composed of a ROM. Regarding each character, the character data storage unit 2 stores character data including a character code, radical pattern codes indicating radical patterns constituting the character pattern, figure pattern data to be obtained after changes (figure pattern data change information), and restoration information including positions and sizes of the radical patterns. The radical pattern data storage unit 3 is composed of a ROM, and stores radical patterns normalized in standard sizes and pattern codes thereof, figure patterns and pattern codes thereof, and radical restoration information.

The data processing device 4 is composed of a RAM, a CPU, and a program memory. The data processing device 4 includes a character data retrieving unit 41, a character data coordinate changing unit 42, a radical restoring unit 43, and a developing unit 44. Control programs for controlling various operations are stored in the data processing device 4.

The character data retrieving unit 41 retrieves character data which correspond to a character code supplied from the input device 1, from the character data storage unit 2. The character data coordinate changing unit 42 changes coordinates so that the position and size of the restoration information of the character data coincides with the inputted character size. The radical restoring unit 43 restores radical patterns included in the character data, based on the restoration information on the radical patterns after the coordinate changes. Then, the developing unit 44 develop the radical patterns thus restored into dot patterns.

Figure 2:
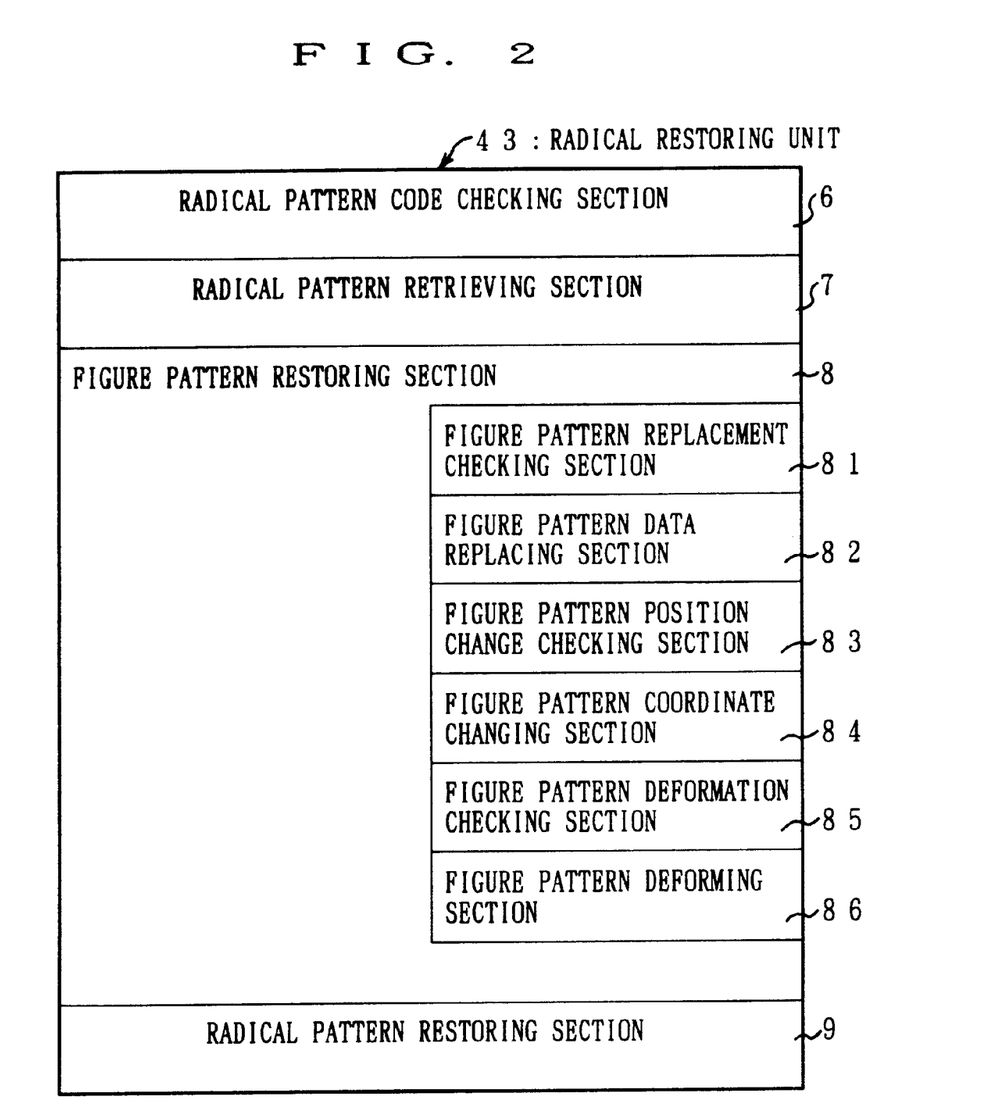
FIG. 2 is an explanatory view illustrating an arrangement of a radical pattern restoring unit of the character forming apparatus.

The radical restoring unit 43 includes a radical pattern code checking section 6, a radical pattern retrieving section 7, a figure pattern restoring section 8, and a radical pattern restoring section 9. The radical pattern code checking section 6 checks whether or not a radical pattern code is included in the character data. In the case where a radical pattern code is included in the character data, the radical pattern retrieving section 7 retrieves the radical pattern from the radical pattern data storage unit 3. The figure pattern restoring section 8 restores figure patterns included in the radical data, in accordance with the restoration information on the figure patterns after the coordinate changes. The radical pattern restoring section 9 restores radical patterns included in the character data in accordance with restoration information in the character data storage unit 2.

Furthermore, the figure pattern restoring section 8 includes a figure pattern replacement checking section 81, a figure pattern data replacing section 82, a figure pattern position change checking section 83, a figure pattern coordinate changing section 84, a figure pattern deformation checking section 85, and a figure pattern deforming section 86.

The figure pattern replacement checking section 81 checks whether or not figure pattern replacement information is included in the figure pattern data change information in the character data. In the case where figure pattern replacement information exists, the figure pattern data replacing section 82 compares the figure pattern data included in the radical data with the figure pattern data included as figure pattern replacement information in the character data, and replaces the former with the latter. The figure pattern position change checking section 83 checks whether or not figure pattern position change information is included in the figure pattern data change information in the character data. In the case where the figure pattern position change information exists, the figure pattern coordinate changing section 84 changes coordinates of points on the outline of the figure pattern so as to change the position of the figure pattern. The figure pattern deformation checking section 85 checks whether or not figure pattern deformation information is included in the figure pattern data change information in the character data. In the case where the figure pattern deformation information exists, the figure pattern deforming section 86 deforms the figure pattern in the radical data in accordance with coordinates after the deformation which are stored in the figure pattern deformation information.

The output device 5 is a display device such as a CRT display device or an LCD device, or a printing device such as a line thermal printer, an ink-jet printer, or a laser printer, and outputs dot patterns formed as character patterns.

Figure 3:
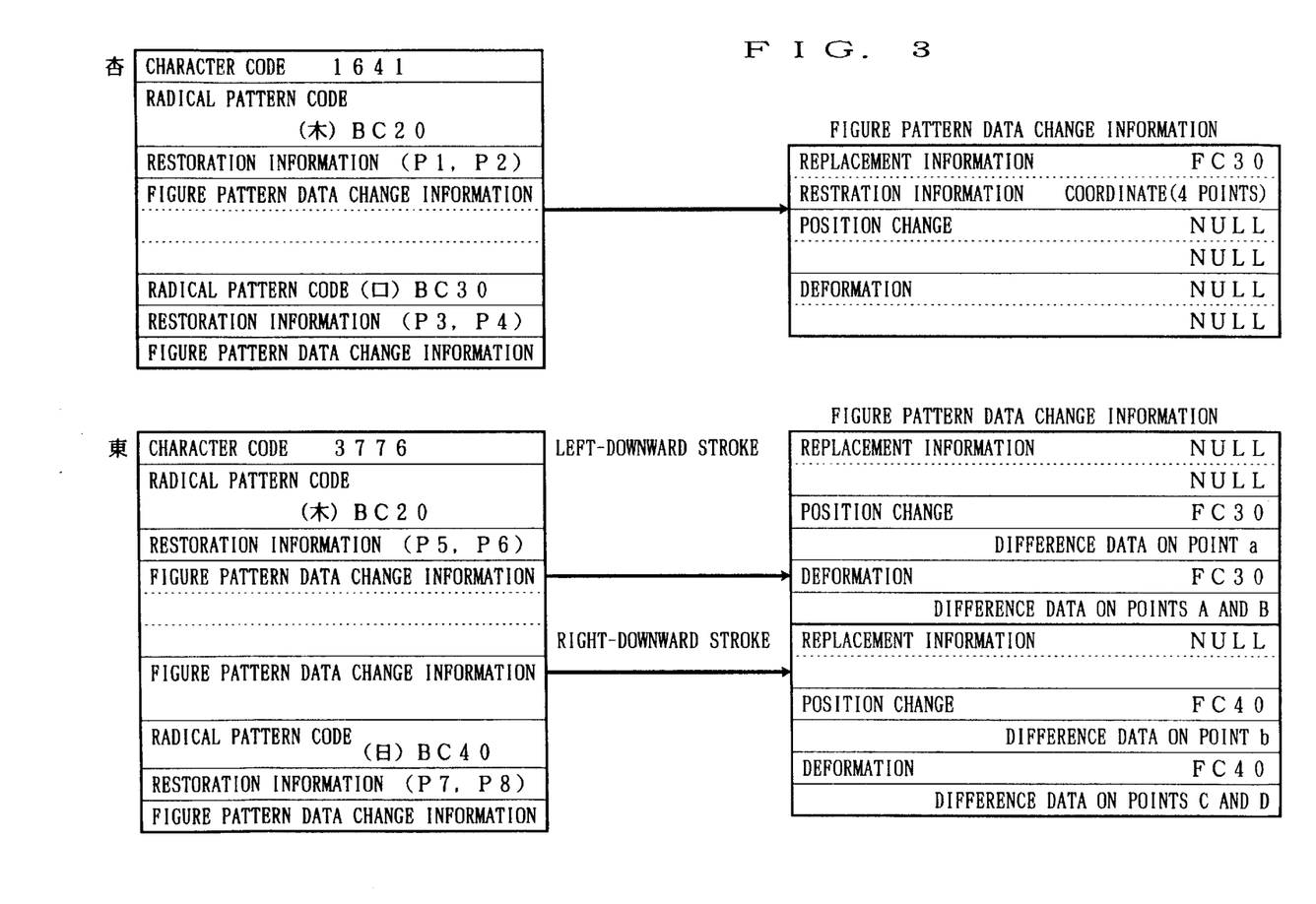
FIG. 3 is an explanatory view illustrating character data stored in a character data storage unit of the character forming apparatus.

FIG. 3 illustrates character data stored in the character data storage unit 2. Here, Chinese characters "舌" and "東" are taken as examples.

In the character data of the Chinese character "舌", a character code "1641", and a radical pattern code "BC20" of a radical pattern "木" which constitutes a character corresponding to the character code are included. In the restoration information on the radical pattern "木" "P1, P2" is stored as information indicating a position and a size of the radical pattern when it is restored. In the figure pattern replacement information in the figure pattern data change information, a figure pattern code "FC30" and table data on the figure pattern after replacement are included. Thus, regarding the character whose figure patterns are changed, data on the same exist in the figure pattern data change information.

Regarding the other radical pattern "口" constituting the character pattern of the Chinese character "東", likewise, a pattern code "BC30" is stored, and "P3, P4" is stored in the restoration information. Here, since no figure pattern of the radical pattern data "口" is changed, no data exist in any part of the figure pattern data change information.

In the case of the character data of the Chinese character "東", a character code "3776" and a pattern code "BC20" of a radical pattern "木" are stored. As restoration information regarding the radical pattern "BC20", "P5, P6" is stored as information indicating the position and the size when the radical pattern "木" is restored.

Besides, since a left-downward stroke and a right-downward stroke of the radical pattern "木" are to be deformed and positions thereof are to be changed, data on the position changes and deformation exist in the respective figure pattern data change information regarding the left-downward stroke and the right-downward stroke.

To be more specific, on the changes of the figure patterns included in the radical pattern "BC20" in the character data of the Chinese character "東", a figure pattern code "FC30" of the left-downward stroke is stored, and difference data on a starting point 'a' (see FIG. 6) of the figure pattern "FC30" are stored as restoration information. The difference data is given as (x-X, y-Y), wherein coordinates of the starting point 'a' before the change are given as (X, Y), while coordinates thereof after the change are given as (x, y).

In the case where the point 'a' is transferred to the position (x-X, y-Y), the other points are transferred likewise as relative coordinates with respect to the point 'a'. In this case, the left-downward stroke is transferred downward (see FIG. 7(b)).

In the figure pattern deformation information, the figure pattern code "FC30" is stored. The figure pattern "FC30" is deformed by transferring points A and B on an outline of the figure pattern through a distance corresponding to difference data stored as restoration information.

In the case of the right-downward stroke, likewise, a figure pattern code "FC40" is stored in the figure pattern position change information, and difference data on a starting point 'b' are also stored as restoration information. In the figure pattern deformation information, the figure pattern code "FC40" is stored in the figure pattern deformation information, and difference data on the points C and D are stored as restoration information.

No data are stored in the figure pattern replacement information, since replacement of figure patterns is not required in the character data of the Chinese character "東".

Furthermore, since the character data of the Chinese character "東" includes a radical pattern "日" indicated with a radical pattern code "BC40", the radical pattern code "BC40" and restoration information "P7, P8" are stored, as is the case with the radical pattern "木". But, since no change of the figure pattern is required, no data exist in any part of the figure pattern data change information.

Figure 5:
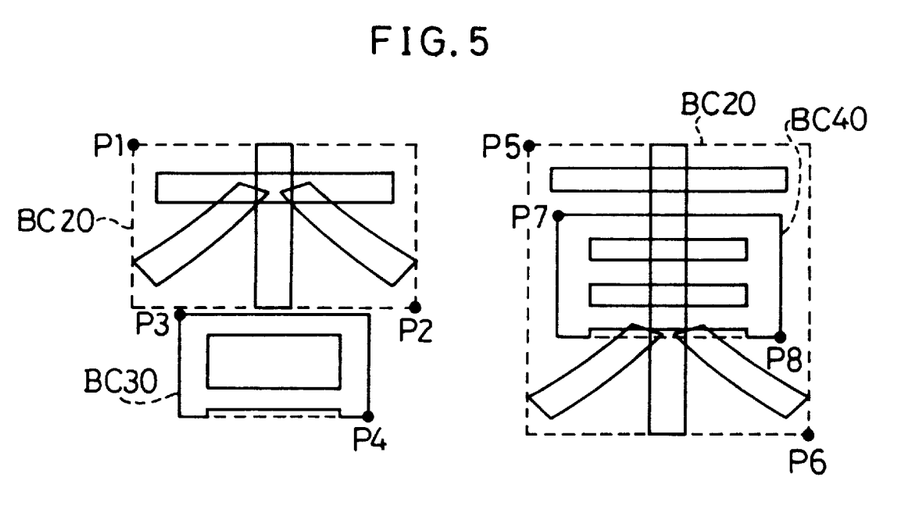
FIG. 5 is an explanatory view illustrating image examples of characters stored in the character data storage unit of the character forming apparatus.

FIG. 5 illustrates examples of images of the character data of the Chinese characters "舌" and "東" stored in the character data storage unit 2. In the case of the Chinese character "舌", the character code indicating the Chinese character "舌", the radical pattern code "BC20" indicating the radical pattern "木", the restoration information "P1, P2" indicating the position and size of the radical pattern which is necessary for restoration, the radical pattern code "BC30" indication the radical pattern "口", and the restoration information "P3, P4" are stored. Here, each pair of the points of the restoration information represent the coordinates of opposite vertexes of a rectangle encircling each radical pattern.

The position and size of the character are changed by, for example, transferring the positions of the two points "P1, P2" at upper left and lower right, respectively, which are the restoration information of the radical pattern "木", in accordance with the character size inputted from the input device 1.

Figure 6:
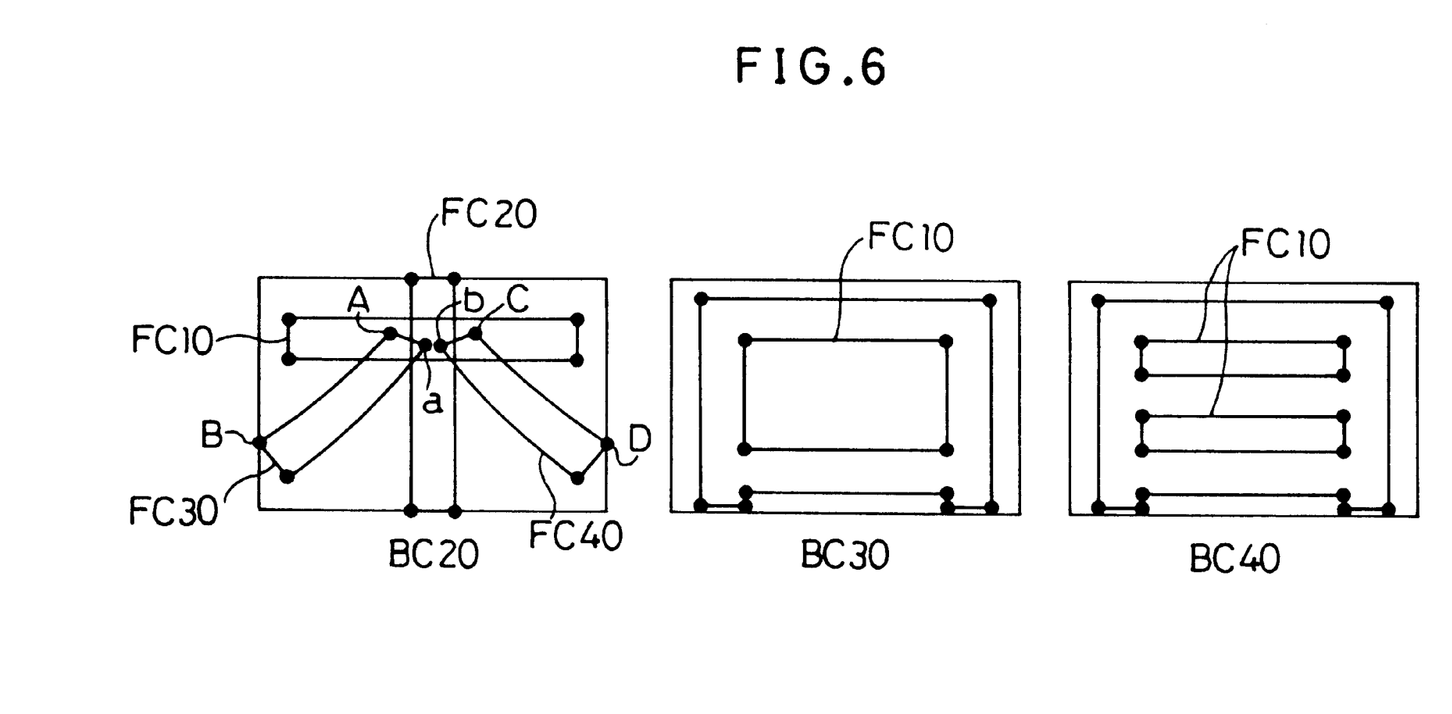
FIG. 6 is an explanatory view illustrating image examples of radical patterns stored in a radical pattern data storage unit of the character forming apparatus.

FIG. 6 is an explanatory view illustrating the radical data of the radical patterns "木", "口", and "日" stored in the radical pattern data storage unit 3. For example, the radical pattern "木" of the radical pattern code "BC20" is composed of a figure pattern "horizontal stroke" of a figure pattern code "FC10", a figure pattern "vertical stroke" of a figure pattern code "FC20", the figure pattern "left-downward stroke" of the figure pattern code "FC30", and the figure pattern "right-downward stroke", of the figure pattern code "FC40". The radical patterns stored in the radical pattern data storage unit 3 are normalized so as to have a predetermined uniform size.

Note that the outline font is used for the radical patterns and the figure patterns described above.

By arranging as described above, changes at the figure pattern level can be carried out with respect to the radical pattern "BC20" included in the character data of the Chinese character "舌", in accordance with the figure pattern data change information (the figure pattern replacement information, the figure pattern position change information, the figure pattern deformation information). The following description will explain a character forming (changing) process by the aforementioned character forming apparatus, while referring to the flowchart of FIG. 4.

Figure 4:
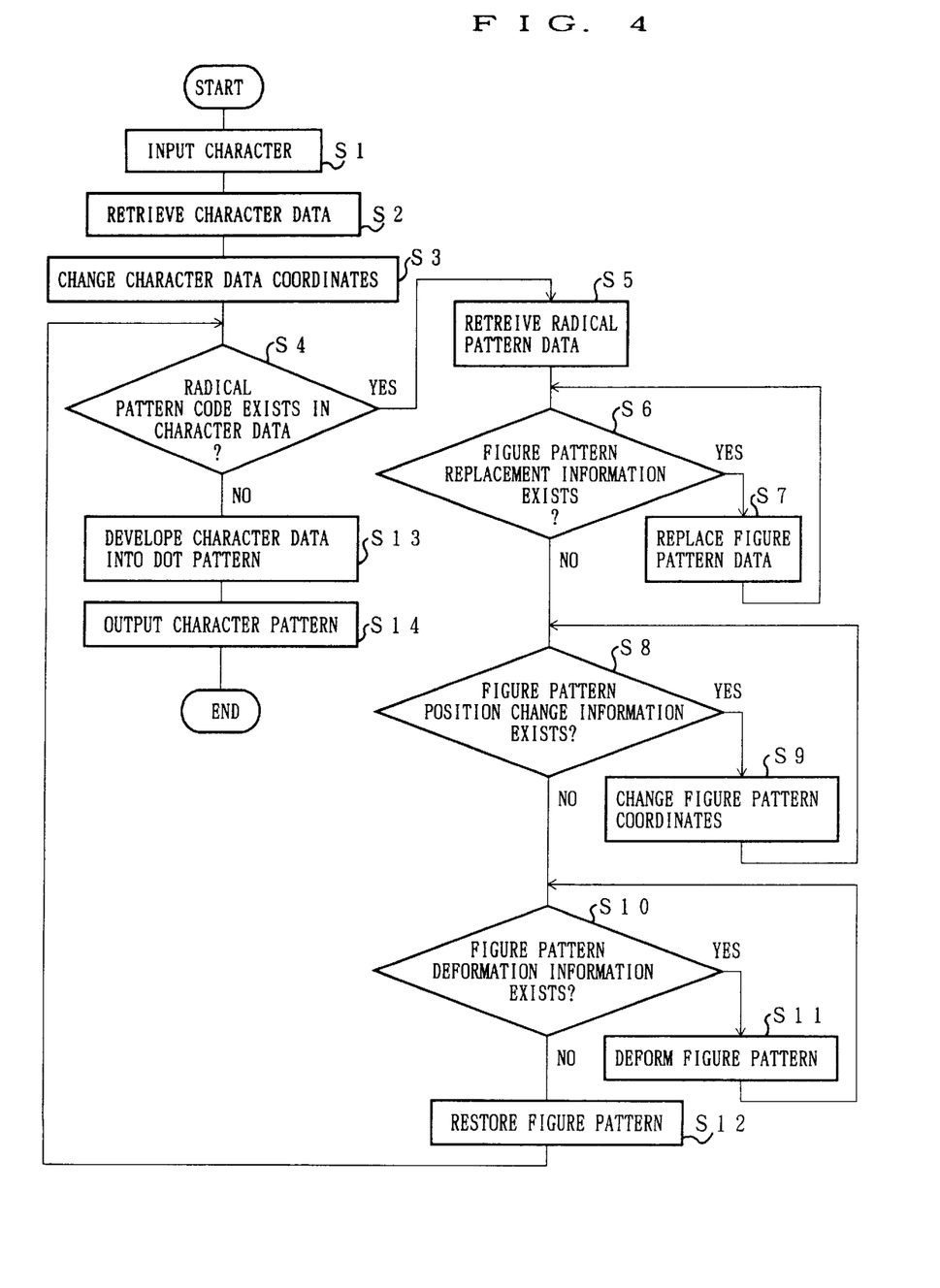
FIG. 4 is a flowchart illustrating a character forming process in the character forming apparatus.

At a step S1, a character code, a character size, and the like, are inputted through the input device 1 such as a key board. For example, in the case of the Chinese character "舌", the character code "1641" and the character size "56 dots" are inputted, which are information for causing the character data of the Chinese character "杏", to be outputted to the output device 5. The inputted information such as the character code "1641" and the character size "56 dots" is sent to the character data retrieving unit 41 of the data processing device 4.

At a step S2, character data having a character code corresponding to the character code "1641" thus inputted through the input device 1 is retrieved by the character data retrieving unit 41 from the character data storage unit 2. The character codes stored in the character data storage unit 2 are temporarily read out into a buffer, and the character codes are compared with the character code inputted. In the case where the same character code "1641" is found, the following data are given to the character data coordinate changing unit 42: (1) the character code "1641"; (2) the radical pattern codes "BC20" and "BC30" which are stored with the character data having the character code "1641"; (3) the restoration information "P1, P2" of the radical pattern "BC20", and the restoration information "P3, P4" of the radical pattern "BC30"; (4) since the figure patterns are replaced in the case of the Chinese character "杏" the figure pattern code, and the figure pattern table after the replacement, which are the figure pattern replacement information in the figure pattern data change information; and (5) the character size inputted through the input device 1.

At a step S3, the character data coordinate changing unit 42 changes coordinates of the character data supplied by the character data retrieving unit 41, in accordance with the character size inputted. Regarding the figure pattern data in the character data except for the radical patterns, the respective x- and y-coordinates are multiplied by m/M, wherein m represents the size such as "56 dots" inputted as size information, and M represents the size of the character before the coordinate change. Regarding the radical patterns, the coordinate change is carried out by multiplying the respective coordinates of the points "P1, P2" and "P3, P4" as the restoration information by m/M, while the radical pattern codes "BC20" and "BC30" are left as they are.

As a result of the coordinate change, "P1, P2" becomes "P1', P2'", while "P3, P4" becomes "P3', P4'". The character data which have gone through the coordinate changing operation are given to the radical pattern code checking section 6 in the radical restoring unit 43.

At a step S4, in the case where radical pattern codes exist in the character data given by the character data coordinate changing unit 42, it is judged by the radical pattern code checking section 6 that the character data include radical patterns. In the case where no radical pattern code exists, a NULL code is returned. In the case where radical patterns are included, the character data are given to the radical pattern retrieving section 7. In the case where the NULL code is returned, the character data are given to the developing unit 44. For example, the radical code "BC20" of the radical pattern "木" and the radical code "BC30" of the radical pattern "口" are included in the data of the Chinese character "杏", and in this case, the character data are given to the radical pattern retrieving section 7.

At a step S5, the radical pattern retrieving section 7 retrieves, from the radical pattern data storage unit 3, radical data corresponding to the radical pattern codes in the character data given from the radical pattern code checking section 6, and gives them to the character data. The radical pattern codes in the radical pattern data storage unit 3 are read out and temporarily stored in a buffer, and are checked against the radical pattern codes in the character data. In the case where an identical radical pattern code exists, the radical pattern, the radical restoration information, and figure pattern codes of figure patterns included in the radical are given to the figure pattern replacement checking section 81 in the figure pattern restoring section 8, together with the character data. For example, with respect to the radical pattern code "BC20" of the radical pattern data "木" included in the Chinese character data "杏", the radical pattern codes stored in the radical pattern data storage unit 3 are sequentially read out and stored in the buffer until the radical pattern code "BC20" is found. When the radical pattern code "BC20" is found, data on the radical (a radical pattern, radical restoration information, and figure pattern codes) and the character data as well as the radical pattern code "BC20" are given to the figure pattern replacement checking section 81 in the figure pattern restoring section 8.

(1) Replacement of Figures

At a step S6, in the case where, regarding the character data and the radical data given by the radical pattern retrieving section 7, figure pattern codes as figure pattern data change information exist in the figure pattern data replacement information in the character data, the figure pattern replacement checking section 81 judges that the figure patterns are to be replaced, and the character data and the radical data are given to the figure pattern data replacing section 82. For example, taking the Chinese character "杏" as an example, in the case where a figure pattern code "FC30" of a figure pattern to be replaced exists, as the figure pattern data replacement information, in the figure pattern data change information in the character data, it is judged that the figure pattern "FC30" is to be replaced, and the character data and the radical data are given to the figure pattern data replacing section 82. In the case where no figure pattern code exists in the figure pattern data change information in the character data, it is judged that no figure pattern is to be replaced, and the character data and the radical data are given to the figure pattern position change checking section 83 (the flow proceeds to a step S8).

At a step S7, the figure data in the radical pattern data, among the character data and the radical data given from the figure pattern replacement checking section 81, are replaced with the figure data in the character data by the figure pattern data replacing section 82. For example, taking the Chinese character "杏" as an example, the figure pattern code "FC30" of the figure pattern to be replaced is included in the figure pattern data replacement information, while the table data of the figure pattern after replacement are stored in the character data. Therefore, by referring to the table data of the figure pattern in the character data, the table data of the figure pattern data "FC30" in the radical data are changed.

(2) Change of Figure Position

At the step S8, in the case where figure pattern codes exist in the figure pattern position change information in the figure pattern data change information in the character data, the figure pattern position change checking section 83 gives the character data and the radical data to the figure pattern coordinate changing section 84. In the case where no figure pattern code exists therein, the character data and the radical data are given to the figure pattern deformation checking section 85 (the flow proceeds to a step S10).

To be more specific, in the case where a figure pattern code of a figure pattern whose position is to be changed is stored in the figure pattern position change information, the character data and the radical data are given to the figure pattern coordinate changing section 84. In the case where a NULL code exists in the figure pattern position change information, it is judged that no figure pattern position is changed, and the character data and the radical data are given to the figure pattern deformation checking section 85. In the case of the radical pattern " 木 " included in the Chinese character data " 杏 ", no figure position change is required, thereby resulting in that the character data and the radical data are given to the figure pattern deformation checking section 85.

On the other hand, in the case of the Chinese character " 東 ", a figure pattern code "FC30" exists in the figure pattern position change information in the figure pattern data change information on the radical pattern " 木 ". Therefore, the character data and the radical data are given to the figure pattern coordinate changing section 84. In other words, since the figure pattern position change information contains the figure pattern code "FC30" of the figure pattern "left-downward stroke" included in the radical pattern " 木 " and the difference data regarding the coordinates of the point 'a' before and after the change, the character data and the radical data are given to the figure pattern coordinate changing section 84.

Figure 7A:
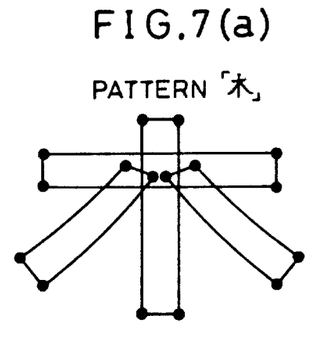
FIGS. 7(a) through 7(d) are explanatory views illustrating respective image examples in the case where figure pattern position changing operations and the deforming operations are applied to a radical pattern  in a character data on a Chinese character  in the character forming apparatus.
Figure 7B:
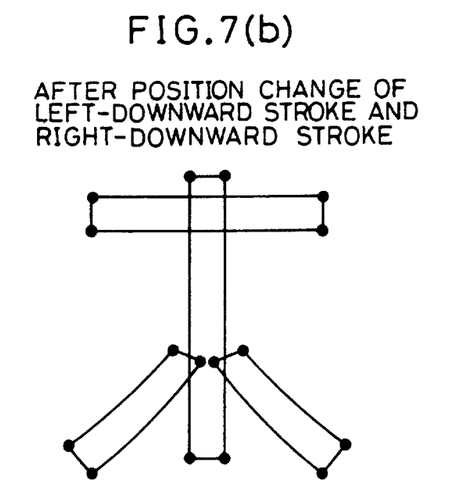

At a step S9, the figure pattern coordinate changing section 84 changes coordinates of points on the outline of the figure pattern "left-downward stroke" so as to change the position of the figure pattern "left-downward stroke". To be more specific, since the figure pattern code "FC30" and the difference data (x-X, y-Y) as restoration information regarding the coordinates (X, Y) of the point 'a' before the change and the coordinates (x, y) of the point 'a' after the change are stored in the figure pattern position change information, the point 'a' on the outline of the "left-downward stroke" of the figure pattern "FC30" is transferred by a distance corresponding to the difference data, and the other three points are also transferred as relative coordinates with respect to the point 'a'. In this case, the "left-downward stroke", is transferred downward from the original position (see FIG. 7(*b*)). After the position change of the figure pattern "left-downward stroke", the flow returns to the step S8, and then, again proceeds to the step S9. Here, the figure pattern "right-downward stroke" is transferred downward in the same manner. Note that as directions of the transfer, the Y axis direction, the " " axis direction, and diagonal directions can be taken as examples.

(3) Deformation of Figure Patterns

At the step S10, in the case where the figure pattern deformation checking section 85 judges that information indicating deformation of figure patterns exists in the character data, the character data and the radical data are given to the figure pattern deforming section 86. In the case where no such information exists, the character data and the radical data are given to the radical pattern restoring section 9 (the flow proceeds to a step S12). For example, in the case of the Chinese character " 東 ", the "left-downward stroke" of the radical pattern " 日 " is deformed. Since the figure pattern code "FC30" of the "left-downward stroke" is stored in the figure pattern deformation information in the figure pattern data change information in the character data, the character data and the radical data are given to the figure pattern deforming section 86.

Figure 7C:
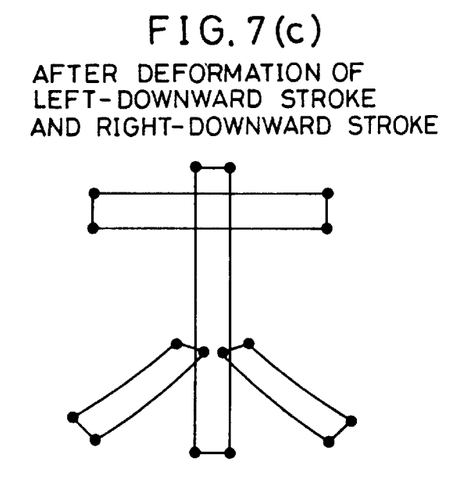

At a step 11, the figure pattern deforming section 86 deforms an outline of the figure pattern, in accordance with the deformation information in the character data supplied by the figure pattern deformation checking section 85. The figure pattern code "FC30" of the figure pattern to be deformed and the difference data on the coordinates before and after the transfer of the two points, the point A and the point B, are stored in the figure pattern deformation information in the figure pattern change information in the character data on the Chinese character " 東 ". Therefore, the points A and B are transferred in accordance with the difference data, and the figure data are changed accordingly (see FIG. 7(*c*)). After the deformation of the figure pattern "left-downward stroke", the flow returns to the step S10, then again proceeds to the step S11, so that the figure pattern "right-downward stroke" is deformed in the same manner.

Points to be transferred vary with characters. When the process ends, the character data and the radical data are given to the radical pattern restoring section 9.

At the step 12, the radical pattern restoring section 9 restores the given radical pattern and gives it to the developing unit 44. In the case where a radical pattern code of the radical pattern " 木 " after the figure pattern change is given as "BC20'" and restoration information obtained as a result of change by the character data coordinate changing unit 42 is given as "P1', P2'", the restoration of the radical data is carried out in the following manner: coordinates of the points constituting the radical pattern "BC20" having a size indicated by "P1, P2" are changed so that the radical pattern "BC20" obtained as a result of the coordinate changes has a size represented by a rectangle having the two points "P1', P2'" as opposite vertexes. Thus, the radical pattern after the changes is restored in the rectangle indicated by "P1', P2'".

Figure 7D:
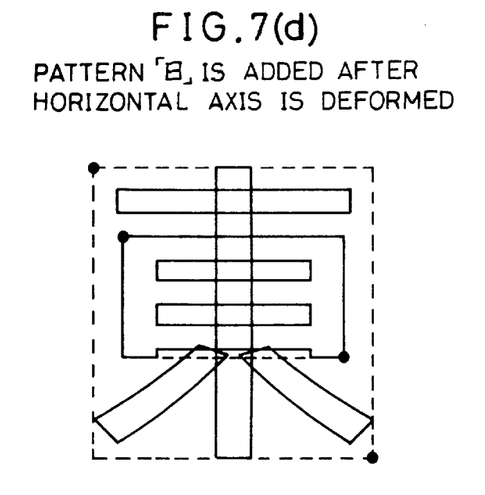

After the restoration of the radical pattern " 木 ", flow returns to the step S4. Here, in the case of the Chinese character " 東 ", the radical pattern " 日 " which has not yet been restored is retrieved by the radical pattern retrieving section 7. Since no figure pattern data change information exists, the radical pattern is restored by using the restoration information "P3', P4'", like the radical pattern " 木 ". In the case of the Chinese character " 東 ", the pattern " 日 " is added after the horizontal axis is deformed (see FIG. 7(*d*)). The character data wherein the radical pattern is restored are given to the developing unit 44.

At a step S13, the developing unit 44 develops into a dot pattern the character data wherein all the radical patterns are restored, and the dot pattern is given to the output device 5.

Finally, at a step S14, the output device 5 outputs the character pattern thus developed into the dot pattern. With this, the character forming process ends.

As so far described, with the character forming apparatus of the present embodiment, when a character pattern is changed, it is possible to individually designate a plurality of figure patterns included in one radical pattern and restore them in the character pattern. Therefore, the quality of the character pattern is not deteriorated. In other words, when a character pattern is formed, figure pattern data and restoration information on each figure pattern included in one radical pattern can be individually designated for each character, and figure patterns suitable for each character can be obtained. Therefore, it is possible to enhance the quality of the character patterns.

Note that the character forming apparatus of the present embodiment can be applied to electronic information processing apparatuses, such as a word processor, a computer, and an electronic pocket diary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A character forming apparatus comprising:

a character data storage unit for storing character data of each character pattern, the character data including a character code, a radical pattern code indicating a radical pattern, figure pattern data change information for correcting a figure pattern representing an outline of a stroke, and restoration information on a position and size of the radical pattern;

a radical pattern data storage unit for storing radical data including a radical pattern, a radical pattern code, radical restoration information, a figure pattern, and a figure pattern code;

an input unit for inputting the character code and the character size;

a character data retrieving unit for retrieving character data corresponding to the inputted character code from said character data storage unit;

a character data coordinate changing unit for changing coordinates for enlargement or reduction in accordance with the inputted character size;

a radical restoring unit for, in the case where a radical pattern code exists in the character data, restoring the radical data;

a figure pattern restoring unit for, in the case where a figure pattern code exists in the radical data, changing the figure pattern and restoring it, said figure pattern restoring unit being provided either inside or outside said radical restoring unit;

a developing unit for developing the restored character data into a dot pattern; and an output unit for outputting the dot pattern.

2. The character forming apparatus as set forth in claim 1, wherein during the figure pattern changing operation by said figure pattern restoring unit, operations such as replacement, parallel transfer, and deformation by transfer of points on an outline are carried out.

3. The character forming apparatus as set forth in claim 1, wherein said figure pattern restoring unit includes:

a figure pattern replacement checking section for checking whether or not figure pattern replacement information exists in the figure pattern data change information in the character data;

a figure pattern data replacing unit for, in the case where the figure pattern replacement information exists, replacing the figure pattern data included in the radical data by referring to corresponding figure pattern data included as figure pattern replacement information in the character data;

a figure pattern position change checking unit for checking whether or not figure pattern position change information exists in the figure pattern data change information in the character data;

a figure pattern coordinate changing unit for, in the case where the figure pattern position change information exists, changing coordinates of points on the outline of the figure pattern so as to change the position of the figure pattern;

a figure pattern deformation checking unit for checking whether or not figure pattern deformation information exists in the figure pattern data change information in the character data; and a figure pattern deforming unit for, in the case where the figure pattern deformation information exists, deforming the figure pattern in the radical data, in accordance with coordinates after deformation stored in the figure pattern deformation information.

4. The character forming apparatus as set forth in claim 3, wherein said radical restoring unit includes:

a radical pattern code checking unit for checking whether or not a radical pattern code exists in the character data;

a radical pattern retrieving unit for, in the case where the radical pattern code exists in the character data, retrieving a corresponding radical pattern from said radical pattern data storage unit; and a radical pattern restoring unit for restoring the radical pattern included in the character data, in accordance with the restoration information stored in said character data storage unit, wherein said figure pattern restoring unit is provided inside said radical restoring unit.

5. The character forming apparatus as set forth in claim 4, wherein during the figure pattern changing operation by said figure pattern restoring unit, figure pattern data replacement, figure pattern position change, and figure pattern deformation are carried out in this order, prior to the restoration of each radical pattern.

6. The character forming apparatus as set forth in claim 5, wherein, when there is any operation indicated as unecessary among the three operations, such unnecessary operation is omitted.

7. The character forming apparatus as set forth in claim 6, wherein in the case where a plurality of radical pattern codes are included in the character data, the whole process of the radical pattern change and restoration is carried out with respect to one radical pattern, and thereafter, the process is carried out to another radical pattern.

8. The character forming apparatus as set forth in claim 7, wherein the character data are developed into a dot pattern after all the radical patterns are restored.

* * * * *